United States Patent Office 3,763,196
Patented Oct. 2, 1973

3,763,196
17-ESTERS OF 6α,9α-DIFLUORO-21-DESOXYPREDNISOLONE
Rinaldo Gardi and Carate Brianza, Milan, Romano Vitali, Casatenovo, Como, and Giovanni Falconi, Milan, Italy, assignors to Warner-Lambert Company, Morris Plains, N.J.
No Drawing. Filed Nov. 14, 1972, Ser. No. 306,636
Claims priority, application Italy, Nov. 19, 1971, 31,368/71
Int. Cl. C07c *169/34*
U.S. Cl. 260—397.45         4 Claims

ABSTRACT OF THE DISCLOSURE

The 17-propionate, 17-butyrate and 17-benzoate of 6α,9α-difluoro-21-desoxyprednisolone which can be prepared from the corresponding 17-esters of 6α,9α-difluoroprednisolone by reductive elimination of the hydroxy group at $C_{21}$, are useful as topical anti-inflammatory agents.

BACKGROUND OF THE INVENTION

A number of 17-monoesters of 17α,21-dihydroxy steroids have been developed and studied as topical anti-inflammatory agents for the treatment of various conditions and inflammations of the skin and other body tissues. Such 17-monoesters of 21-hydroxylated steroids are, however, chemically not very stable and can rearrange to the isomeric 21-monoesters in a high pH range. For this reasons the active 17-monoesters are to be handled with care and are formulated into preparations suitable for topical administration in a proper manner so to avoid the risk of this rearrangement since the isomeric 21-monoesters are appreciably less active on topical application.

The search for more stable and even more effective topical agents therefore continues.

The present invention provides certain new 17-esters of 6α,9α-difluoro-21-desoxyprednisolone which have, in addition to the chemical stability, a topical anti-inflammatory effect by far superior to that of other closely analogous compounds of the prior art.

SUMMARY AND DETAILED DESCRIPTION

This invention relates to certain new 17-ester derivatives of 6α,9α-difluoro-11β,17α-dihydroxpregna-1,4-diene-3,20-dione (21-desoxyprednisolone) having increased and prolonged anti-inflammatory activity on topical application.

The invention also relates to pharmaceutical compositions containing such compounds in admixture with a pharmaceutically acceptable carrier for the topical treatment of inflammatory conditions in animals and humans.

The new 17-ester derivatives of this invention are represented by the formula:

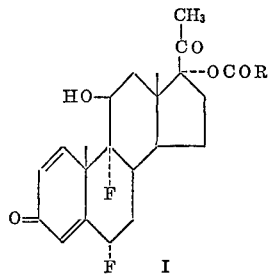

I where R is an alkyl group containing 2 or 3 carbon atoms or the phenyl radical.

Specific compounds of this invention are the 17-propionate, 17-butyrate and 17-benzoate of 6α,9α-difluoro-21-desoxyprednisolone which have a selective topical activity and low systemic effects.

The properties of these compounds have been evaluated using the vasoconstriction test and the granuloma pouch assay in comparison with other known topically active 17-esters of 21-hydroxy and 21-desoxy steroids.

The vasoconstriction test (which measures the degree of evident blanching caused by various dilutions of corticosteroids when applied to the human skin) was performed in the following manner. The test steroids dissolved in 95% alcohol solution were applied by paper-patches to the flexor surfaces of the forearms of human volunteers. The patches were removed 18 hours later and the arms examined for vasoconstriction by three independent observers who scored from zero to three according to the blanching degree within each subject. The responses were recorded as percent of the maximum blanching, score 3 being considered equal to 100.

The results obtained with each of the test steroids at various dose-levels are reported in Table I, where vasoconstriction is expressed in percent of the maximum blanching.

TABLE I.—VASOCONSTRICTION

| Dose, µg. | 6α,9α-difluoro-21-desoxy-prednisolone, percent | | Betamethasone, percent | |
|---|---|---|---|---|
| | 17-propionate | 17-butyrate | 17-valerate | 17-benzoate |
| 0.02 | 46 | 60 | 24 | 36 |
| 0.06 | 63 | 72 | 36 | 39 |
| 0.18 | 99 | 100 | 67 | 70 |

It will be observed from Table I that the compounds of this invention are more potent than both 17-valerate and 17-benzoate of betamethasone. The calculation of the relative potencies indicates that the 17-propionate and 17-butyrate of 6α,9α-difluoro-21-desoxyprednisolone are about three times more potent than betamethasone17-valerate, one of the most effective anti-inflammatory steroids for topical application.

The granuloma pouch assay was carried out on female rats in accordance with the technique of Robert and Nezamis (Acta Endocr. 25, 105; 1957). The rats were injected subcutaneously with 25 ml. of sterile air under ether anesthesia, and croton oil (0.5 ml. of 1% solution in corn oil) was injected into the air sac. The test steroids dissolved in 0.2 ml. of sesame oil were administered on day 5 directly into the cavity of the pouch. On day 9 the animals were sacrificed and the exudate was collected and measured, the volume of exudate being inversely proportional to the anti-inflammatory potency of the steroid.

TABLE II.—GRANULOMA POUCH

| Compound into pouch (0.2 ml./oil) | Single dose | | Exudate, ml. | | Percent inhibition of exudate vs. controls |
| --- | --- | --- | --- | --- | --- |
| | μMole | μG. | I° experiment | II° experiment | |
| Control | | | 18.4±2 | 14.6±2 | |
| 6α,9α-difluoro-21-desoxyprednisolone 17-propionate | 0.002 | 0.872 | 9.7±2 | 6.6±1.5 | 47–55 |
| | 0.02 | 8.72 | 6.0±2 | 5.8±1 | 60–67 |
| 6α,9α-difluoro-21-desoxyprednisolone 17-butyrate | 0.002 | 0.902 | 7.4±1.5 | 5.8±1.5 | 59–60 |
| | 0.02 | 9.02 | 3.5±1.5 | 4.9±1 | 66–80 |
| 6α,9α-difluoro-21-desoxyprednilone 17-benzoate | 0.002 | 0.970 | 5.6±1.5 | 2.4±1 | 70–83 |
| | 0.02 | 9.70 | 1.9±0.5 | 1.0±0.5 | 89–93 |
| 6α,9α-difluoro-21-desoxyprednisolone 17-acetate | 0.002 | 0.844 | | 12.7±2 | 13 |
| | 0.02 | 8.44 | | 11.9±1.5 | 18 |
| 6α,9α-difluoro-21-desoxyprednisolone free alcohol | 0.002 | 0.760 | | 14.3±2.5 | 2 |
| | 0.02 | 7.60 | | 9.5±2 | 35 |
| 6α,9α-difluoroprednisolone 17-propionate | 0.002 | 0.904 | | 14.3±2.5 | 2 |
| | 0.02 | 9.04 | | 8.6±2 | 41 |
| 21-desoxybetamethasone 17-propionate | 0.002 | 0.866 | | 12.8±2.5 | 12 |
| | 0.02 | 8.66 | | 7.8±1.5 | 46 |

It will be observed from Table II that the 17-propionate, 17-butyrate and 17-benzoate of 6α,9α-difluoro-21-desoxyprednisolone are potent inhibitors of the exudate formation while the parent 21-hydroxylated compound and the corresponding 17-monopropionates of 6α,9α-difluoroprednisolone and 21-desoxybetamethasone are unable to display an equivalent activity even when given at a 10 times higher dose. It can also be observed that the high local activity shown by the esters of difluoro-21-desoxyprednisolone is selective for the 17-benzoate, butyrate and propionate since the corresponding lower homolog, 17-acetate, has been found to be markedly less active.

On account of their high and prolonged anti-inflammatory activity the compounds of this invention are useful for the local treatment of various diseases and inflammations of the skin in mammals, such as dermatitis of various type, psoriasis and other allergic conditions.

The compositions of the present invention are employed in dosage forms which contain the active steroid in combination with any pharmaceutically-acceptable excipient or carrier suitable for topical application. These therapeutically useful compositions may take the form of ointments, lotions, creams, emulsions, drops, sprays, suppositories, and aerosols as well known in the pharmaceutical art. For example ointments may be formulated in order to be employed by both hydrophilic and hydrophobic applications while lotions may include aqueous and non-aqueous bases. Suitable pharmaceutical carriers are the ones which are usually employed in pharmaceutical formulation, i.e. fats, vegetable oils, fatty acids, alcohols, polyalkylene glycols, waxes, paraffins, polyesters and so on and they may be mixed when compatible, with water or gelling agents.

The subject compounds are included in the compositions of this invention in an amount sufficient to produce the desired therapeutic effect upon inflammatory processes or conditions. In general, these compositions contain the active ingredient in an amount of from 0.0005% to about 5% in weight and preferably from about 0.001 to about 0.25% in weight. Other substances may be included, such as bacteriostatic agents, antibiotics, cosmetically-acceptable pigments, perfumes and local anaesthetics if such additional properties or characteristics are desirable.

The 17-esters of 6α,9α-difluoro-11β,17α-dihydroxypregna-1,4-diene-3,20-dione may be prepared from corresponding 17-monoesters of the parent 21-hydroxy compound by reductive elimination of the hydroxy group at $C_{21}$ according to known methods. A preferred procedure involves the preparation of the 21-tosylates and the subsequent reduction through the corresponding 21-iodo derivatives, carried out in situ by treatment with an alkaline iodide and an organic acid.

In particular, the starting 17-monoester of 6α,9α-difluoroprednisolone is treated with an excess of p.toluenesulfonic acid at 0–5° C. and the resulting 21-tosylate is first reacted with sodium iodide in acetone solution and then heated with acetic acid. After removal of the iodine, the corresponding 17-ester of 21-desoxy compound is isolated and purified according to known methods, for example by extraction with suitable solvents or by concentration of the reaction mixture followed by recrystallization.

The following examples illustrate in detail the preparation of the compounds of this invention.

Preparation 1

6α,9α-difluoroprednisolone 17-benzoate.—Trimethylorthobenzoate (5 ml.) and pyridine p.toluenesulfonate (500 mg.) were added to an anhydrous solution of 5 g. of 6α,9α-difluoroprednisolone in 150 ml. dioxane and 1000 ml. benzene. The mixture was distilled for about one hour, thus removing two thirds of the solvent. After addition of some drops of pyridine, the solvent was completely removed under reduced pressure. The residue, treated with petroleum ether, was allowed to stand for about two hours and filtered off to give 5.5 g. of 6α,9α-difluoro - 11β - hydroxy - 17,21 - (1' - methoxy - benzylidenedioxy)pregna-1,4-diene, 3,20-dione which, after recrystallization from methylene chloride:ether melted at 204–206° C., $[\alpha]_D = +57°$ (dioxane, c.=1).

A suspension of 2 g. of the 17,21-methylorthobenzoate in 60 ml. methanol was treated with 24 ml. of a buffered solution of sodium acetate at pH 3.9. The mixture was refluxed on water bath for two hours and then allowed to stand overnight at room temperature. The crystalline product which separated was recrystallized from acetone:ether to obtain 1.45 g. of 6α,9α-difluoroprednisolone 17-benzoate melting at 228–231° C., $[\alpha]_D = 14.2°$ (dioxane, c.=1).

Preparation 2

6α,9α-difluoroprednisolone 17-propionate.—The above compound was prepared by the reaction of 6α,9α-difluoroprednisolone with methyl orthopropionate and by acid hydrolysis of the resulting 17,21-methylorthopropionate according to the procedure described in Preparation 1.

The 17-propionate of 6α,9α-difluoroprednisolone shows M.P. 212–215° C., $[\alpha]_D = +9°$ (dioxane, c.=0.5).

Following the same procedure the 17-butyrate of 6α,9α-difluoroprednisolone was prepared, M.P. 193–196° C., $[\alpha]_D = +7°$ (dioxane, c.=0.5).

EXAMPLE 1

6α,9α - difluoro-21-desoxyprednisolone 17-benzoate.— Grams 15 of p.toluenesulfonic acid dissolved in 50 ml. of pyridine and 50 ml. of methylene chloride were added to a solution, cooled at 0° C., of 10 g. of 6α,9α-difluoro-11β,17α,21-trihydroxypregna-1,4-diene-3,20-dione 17-benzoate in 50 ml. pyridine and 50 ml. methylene chloride. The mixture was allowed to stand overnight at 0–5° C., then it was poured into ice and extracted with methylene chloride. The extract was evaporated and the residue was taken up with ether:petroleum ether and filtered off to give gr. 13 of 6α,9α-difluoro-11β,17α,21-trihydroxypregna-1,4-diene-3,20-dione 17-benzoate 21-tosylate melting at 204–206° C. (with decomposition), $[\alpha]_D = -21°$ (dioxane, c.=1).

This intermediate was dissolved in 600 ml. of acetone and treated with 26.5 g. of sodium iodide under reflux for 24 hours. Acetic acid (33 ml.) was then added and the mixture was further refluxed for one hour, then diluted with 250 ml. of a 10% aqueous solution of sodium bisulfide, concentrated under vacuum and extracted with methylene chloride. After evaporation of the solvent, the residue was taken up with ether:petroleum ether and recrystallized to give 8.5 g. of 6α,9α-difluoro-21-desoxyprednisolone (or 11β,17α-dihydroxy-pregna-1,4-diene-3,20-dione) 17-benzoate melting at 282–284° C., $[\alpha]_D = -6.6°$ (dioxane, c.=1)

EXAMPLE 2

6α,9α-difluoro-21-desoxyprednisolone 17-propionate.—6α,9α-difluoroprednisolone 17-propionate was converted into the corresponding 21-tosylate (M.P. 205–207° C.) according to the procedure of Example 1 and the intermediate 17,21-diester was treated with sodium iodide and acetic acid under the above conditions to give 6α,9α-difluoro-21-desoxyprednisolone 17-propionate, melting at 235–237° C., $[\alpha]_D = +20.5°$ (dioxane, c.=1).

EXAMPLE 3

6α,9α-difluoro-21-desoxyprednisolone 17-butyrate.—By operating as described in Example 1, 6α,9α-difluoroprednisolone 17-butyrate was converted into the corresponding 21-tosylate melting at 125° C. (with decomposition), $[\alpha]_D = -12.2°$ (dioxane, c.=1), and the 17,21-diester thus obtained was reacted with sodium iodide and acetic acid to give the 17-butyrate of 21-desoxy compound melting at 219–221° C., $[\alpha]_D = -19.7°$ (dioxane, c.=1).

EXAMPLE 4

An ointment for external use is prepared having the following composition:

| Components: | Percent by weight |
|---|---|
| 6α,9α-difluoro-21-desoxyprednisolone 17-propionate | 0.10 |
| Cetyl alcohol | 0.50 |
| Anhydrous lanolin | 5.00 |
| Distilled water | 5.00 |
| Benzyl alcohol | 0.50 |
| Liquid paraffin | 20.00 |
| White soft paraffin | 68.90 |

Melt the cetyl and benzyl alcohols, the liquid paraffin and the white soft paraffin at 75° C., add the active ingredient, then the lanolin previously mixed with the water. Refine twice.

EXAMPLE 5

A cream for external use is prepared having the following composition:

| Components: | Percent by weight |
|---|---|
| 6α,9α-difluoro-21-desoxyprednisolone 17-propionate | 0.025 |
| Propylparaben | 0.015 |
| Methylparaben | 0.025 |
| Sodium laurylsulphate | 1.000 |
| Propylene glycol | 12.000 |
| Stearyl alcohol | 15.000 |
| White soft paraffin | 12.500 |
| Liquid paraffin | 22.500 |
| Distilled water | 36.935 |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above cream, sodium laurylsulphate can be replaced by Polyoxyl 40 Stearate in an amount of 5% by weight.

EXAMPLE 6

A cream for external use is prepared having the following composition:

| Components: | Percent by weight |
|---|---|
| 6α,9α-difluoro-21-desoxyprednisolone 17-benzoate | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylparaben | 0.050 |
| Tween 80 | 0.200 |
| Polyethylene glycol 6000 | 4.950 |
| Distilled water | 63.130 |

Melt the cetostearyl alcohol, the white soft paraffin, the liquid paraffin and the isopropyl stearate at about 70° C., add a solution of the active ingredient in the propylene glycol, then the other ingredients previously mixed with the water and warmed to 70° C. Refine twice.

EXAMPLE 7

An ointment for external use is prepared having the following composition:

| Components: | Percent by weight |
|---|---|
| 6α,9α - difluoro-21-desoxyprednisolone 17-butyrate | 0.30 |
| Lanolin | 14.25 |
| Liquid paraffin | 17.75 |
| Neomycin sulphate | 0.40 |
| White soft paraffin | 67.30 |

Add the active ingredient and the neomycin sulphate to the other ingredients previously melted at 75° C. and refine twice.

In place or besides the neomycin sulphate, other topically active antibotics can be used, such as colistin sulphate, bacitracin, gramicidin, chloramphenicol or the sulphonamides.

EXAMPLE 8

An ophthalmic ointment is prepared having the following composition:

| Components: | Percent by weight |
|---|---|
| 6α,9α-difluoro-21-desoxyprednisolone 17-benzoate | 0.30 |
| Liquid paraffin | 29.70 |
| White soft paraffin | 70.00 |

Add the active product to the other ingredients, previously sterilized by heating at 120° C. for an hour. Refine twice and distribute into sterile tubes.

EXAMPLE 9

Lotion having the following composition:

| Components: | Percent by weight |
|---|---|
| 6α,9α-difluoro-21-desoxyprednisolone 17-propionate | 0.03 |
| Ethyl alcohol 95° | 50.00 |
| Propylene glycol | 20.00 |
| Distilled water | 29.97 |

Dissolve the active product in the alcohol and add the solution to a clear mixture of the other ingredients.

EXAMPLE 10

Lotion having the following composition:

| Components: | Percent by weight |
|---|---|
| 6α,9α - difluoro-21-desoxyprednisolone 17-butyrate | 0.05 |
| Ethyl alcohol 95° | 40.00 |
| Glycerol | 10.00 |
| Propylene glycol | 30.00 |
| Distilled water | 19.95 |

Prepared as described in Example 9.

EXAMPLE 11

Hydrophilic ointment having the following composition:

| Components: | Percent by weight |
|---|---|
| 6α,9α-difluoro-21-desoxyprednisolone 17-benzoate | 0.025 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water to 100%. | |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above hydrophilic ointment, sodium lauryl-sulphate can be replaced by Polyoxyl 40 Stearate in an amount of 5% by weight.

We claim:
1. A compound of the formula:

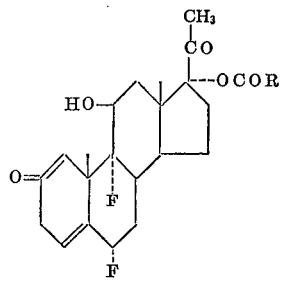

wherein R represents an alkyl group containing 2 or 3 carbon atoms or the phenyl radical.

2. The compound of claim 1 which is 6α,9α-difluoro-21-desoxyprednisolone 17-propionate.

3. The compound of claim 1 which is 6α,9α-difluoro-21-desoxyprednisolone 17-butyrate.

4. The compound of claim 1 which is 6α,9α-difluoro-21-desoxyprednisolone 17-benzoate.

References Cited
UNITED STATES PATENTS

| | | | |
|---|---|---|---|
| 3,297,729 | 1/1967 | Mancini et al. | 260—397.4 |
| 3,474,091 | 10/1969 | Stache et al. | 260—239.55 |
| 3,506,694 | 4/1970 | Oxley | 260—397.45 |

HENRY A. FRENCH, Primary Examiner

U.S. Cl. X.R.

424—243

UNITED STATES PATENT OFFICE
CERTIFICATE OF CORRECTION

PATENT NO. : 3,763,196
DATED : October 2, 1973
INVENTOR(S) : Rinaldo Gardi et al.

It is certified that error appears in the above-identified patent and that said Letters Patent are hereby corrected as shown below:

Column 8, Claim 1, the portion of the formula reading

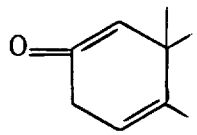   should read   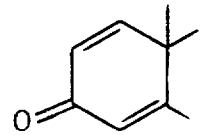

Signed and Sealed this ninth Day of September 1975

[SEAL]

Attest:

RUTH C. MASON
*Attesting Officer*

C. MARSHALL DANN
*Commissioner of Patents and Trademarks*